United States Patent
Karapantelakis et al.

(10) Patent No.: US 12,425,956 B2
(45) Date of Patent: Sep. 23, 2025

(54) METHODS FOR ACCESS SECURITY AT OPERATION AND MAINTENANCE, O AND M, SUPPORT

(71) Applicant: Telefonaktiebolaget LM Ericsson (publ), Stockholm (SE)

(72) Inventors: Athanasios Karapantelakis, Solna (SE); Rafia Inam, Västerås (SE); Marin Orlic, Bromma (SE); Bin Sun, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 431 days.

(21) Appl. No.: 17/770,423

(22) PCT Filed: Oct. 28, 2019

(86) PCT No.: PCT/EP2019/079371
§ 371 (c)(1),
(2) Date: Apr. 20, 2022

(87) PCT Pub. No.: WO2021/083479
PCT Pub. Date: May 6, 2021

(65) Prior Publication Data
US 2022/0394600 A1    Dec. 8, 2022

(51) Int. Cl.
*H04W 48/16* (2009.01)
*H04W 12/08* (2021.01)
*H04W 24/10* (2009.01)
*H04W 68/00* (2009.01)

(52) U.S. Cl.
CPC ........... *H04W 48/16* (2013.01); *H04W 12/08* (2013.01); *H04W 24/10* (2013.01); *H04W 68/00* (2013.01)

(58) Field of Classification Search
CPC ..... H04W 24/10; H04W 48/16; H04W 12/06; H04W 12/63; H04W 68/00; H04W 12/69; H04L 41/0816; H04L 63/20; H04L 41/28
See application file for complete search history.

(56) References Cited

U.S. PATENT DOCUMENTS

| | | | |
|---|---|---|---|
| 8,758,201 B2 * | 6/2014 | Ashby | A63B 22/00 482/901 |
| 2005/0160165 A1 | 7/2005 | Chen et al. | |
| 2019/0013968 A1 * | 1/2019 | Xie | H04L 63/08 |
| 2019/0158513 A1 * | 5/2019 | Shtar | G06F 21/552 |

FOREIGN PATENT DOCUMENTS

WO    2011095215 A1    8/2011

* cited by examiner

*Primary Examiner* — Sulaiman Nooristany
(74) *Attorney, Agent, or Firm* — Murphy, Bilak & Homiller, PLLC

(57) ABSTRACT

The present disclosure relates to a service terminal, a network device and a method for access security at Operation and Maintenance, O&M, support of the network device. The network device (100) and the service terminal (20) are configured to establish a communication using at least one access setting for establishing a communication. The at least one access setting comprising one of the following: an IP address, one or several serial communication parameters, access protocol, authentication method. The method comprises to receive a trigger for changing the at least one access setting for establishing a communication with the service terminal, and to change the at least one access setting for establishing the communication with the service terminal to at least one new access setting.

20 Claims, 13 Drawing Sheets

METHODS FOR ACCESS SECURITY AT OPERATION AND MAINTENANCE, O AND M, SUPPORT

TECHNICAL FIELD

The present technology relates to methods, a network device and a service terminal for access security at Operation and Maintenance, O&M, support.

BACKGROUND

Network devices and IT equipment such as routers, switches, servers, but also baseband, power supply and control units, fan control units, radio units etc. offer a plethora of ways for a maintenance engineer to access, setup or modify their configuration. These "ways" are known in the telecom industry by the term "Operations and Maintenance" (O&M) interfaces, and they typically require a mobile terminal device brought by the engineer to connect to the network device or equipment, thereby establishing a direct connection. Such connection can be point-to-point (i.e. directly to the network device or node, as is the case in some older serial interfaces—see below), or it can be by getting access to a local network, managed by the network device's or node's interface, which acts as a local gateway.

In current state of art, a malicious user can get access to an O&M interface of a network node or network device, in case they use the correct protocol stack, manage to either get assigned or configure a valid IP address, authenticate to the network device or node and be able to encrypt and decrypt data traffic. Although authentication toward the network device or node and data encryption is well-covered in the state of art, it is not unlikely that a malicious user may be able to overcome both authentication and encryption methods (e.g. by getting hold of the private key in a public-private encryption scheme, or knowing the username/password of the network node in different layers of authentication). It is also not unlikely that a user gains a valid IP address, either because the IP address of the network device or network node is known (e.g. many network nodes keep the default IP address, or are configured in a similar way by the enterprise owner), or—in case of dynamic IP address assignment—a user spoofs their MAC address impersonating another network device.

SUMMARY

The object is to provide a solution of the problem to prohibit an unauthorized person having a wireless user equipment to get access to and start a communication with a network device or a network device within a network node.

According to a first aspect, there is provided a method for access security at Operation and Maintenance, O&M, support of a network device and embodiments of the method. The network device and a service terminal are configured to establish a communication using at least one access setting for establishing a communication. The at least one access setting comprises one of the following: an IP address, one or several serial communication parameters, access protocol, authentication method. The method comprises the steps of receiving a trigger for changing the at least one access setting for establishing a communication with the service terminal and changing the at least one access setting for establishing the communication with the service terminal to at least one new access setting.

According to a second aspect, there is provided a network device and embodiments of the device for access security at Operation and Maintenance, O&M, support. The network device and a service terminal are configured to establish a communication using at least one access setting for establishing a communication. The at least one access setting comprises at least one of the following: IP address, one or several serial communication parameters, access protocol, authentication method. The network device comprises a processing circuitry and a memory comprising instructions executable by the processing circuitry, wherein the instructions when executed by the processing circuitry cause the network device to receive a trigger for changing the at least one access setting for establishing the communication with the service terminal and to change the at least one access setting for establishing the communication with the service terminal to at least one new access setting.

According to a third aspect, there is provided a method and embodiments thereof performed by a service terminal for access security at Operation and Maintenance, O&M, support of a network device. The network device and the service terminal are configured to establish a communication using at least one access setting for establishing a communication. The at least one access setting comprising at least one of the following: an IP address, one or several serial communication parameters, access protocol, authentication method. The at least one access setting for establishing a communication with the service terminal is changed to at least one new access setting. The method comprises the steps of receiving from the network device a message reporting the at least one new access setting for establishing a communication with the network device and establishing a communication with the network device by using the at least one new access setting.

According to a fourth aspect, there is provided a service terminal and embodiments thereof for access security at Operation and Maintenance, O&M, support of a network device. A network device and the service terminal are configured to establish a communication using at least one access setting for establishing a communication. The at least one access setting comprises at least one of the following: an IP address, one or several serial communication parameters, access protocol, authentication method. The at least one access setting for establishing a communication with the service terminal is changed to at least one new access setting. The service terminal comprises a processing circuitry and a memory comprising instructions executable by the processing circuitry, wherein the instructions when executed by the processing circuitry cause the service terminal to receive from the network device a message reporting the at least one new access setting for establishing a communication with the network device and to establish a communication with the network device by using the at least one new access setting.

According to a fifth aspect, there is provided a computer program comprising computer program code which, when run in a processing circuitry of a network device, causes the network device to perform the steps of the method for access security at Operation and Maintenance, O&M, support of the network device.

According to a sixth aspect, there is further provided a computer program product comprising a computer program according to the fifth aspect and a computer readable means on which the computer program is stored.

According to a seventh aspect, there is further provided a carrier containing the computer program according to the fifth aspect, wherein the carrier is one of an electronic signal, optical signal, radio signal or computer readable storage medium.

According to an eighth aspect, there is further provided computer program comprising computer program code which, when run in a processing circuitry of a service terminal, causes the service terminal to perform the steps of the method performed by a service terminal for access security at Operation and Maintenance, O&M, support.

According to a ninth aspect, there is also provided a computer program product comprising a computer program according to the eighth aspect and a computer readable means on which the computer program is stored.

According to a tenth aspect, there is also provided a carrier containing the computer program according to the eighth aspect, wherein the carrier is one of an electronic signal, optical signal, radio signal or computer readable storage medium.

One advantage of the herein disclosed methods, network device and service terminal is that an additional level of security for access of on-premise network devices are achieved.

One additional advantage is that the provided methods can function in tandem with existing methods.

Further one advantage is that the provided methods can function with existing hardware equipment and only requires changes in software.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
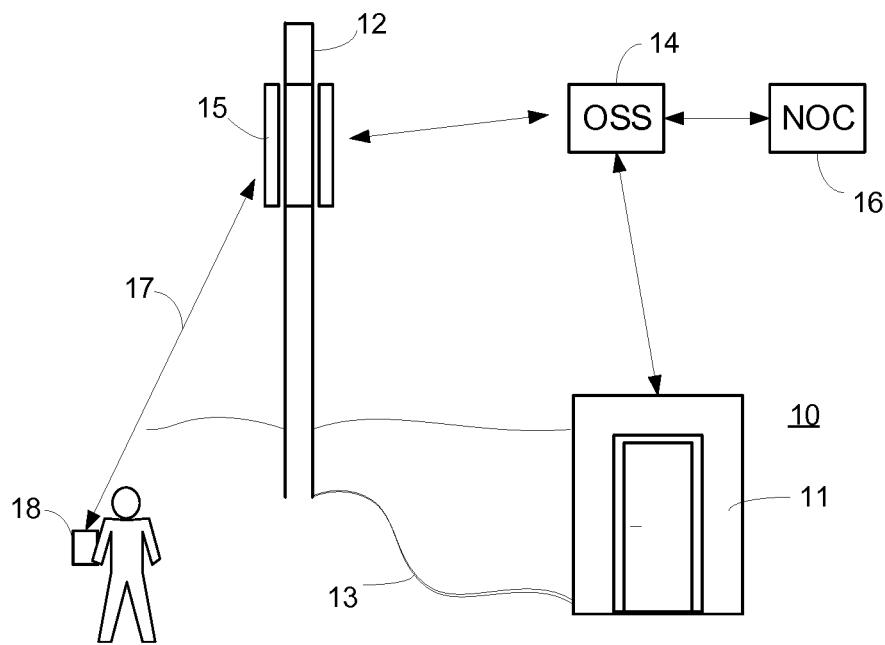
FIG. 1 is a schematic illustration of a network node 10 in a node site.

FIG. 1 is a schematic illustration of a network node 10 in a node site. A network node 10 may be considered as a physical or virtual node. The network node is one of a plurality of network nodes in a telecommunications network. The network node is illustrated as a Radio Baseband Station, RBS, capable of providing telecommunication service to User Equipment 18, UE, within one or more cells being served by the network node 10. The RBS comprises a housing or cabinet 11 comprising network devices (see FIG. 2) for enabling the operation of the network node. However, FIG. 1 is illustrating an RBS node, the meaning of a network node in this disclosure is not limited to radio baseband devices in radio base station housing or cabinet 11. Thus, FIG. 1 is only illustrating an example of a network node.

The network node comprises antenna elements 15 providing radio link connectivity for the UEs 18 within said one or more cells. Said antenna elements 15 are put at a high position of a building 12, such as a tower, house or similar, providing free, wide and long propagation paths, radio links, 17 for the radio waves emitted and received by the antenna elements of the RBS and the UEs. The antenna elements 15 are connected via a cable 13 to the network devices inside the housing 11.

If a network node 10, such as an RBS, is being troubleshoot, a Field Service Engineer (FSE) is sent to the network node to investigate and troubleshoot the network node and its network devices causing the trouble. Network node 10 has the capacity to send data to an Operations Support System (OSS) 14. The OSS 14, such as Ericsson Network Manager (ENM), retrieves information from the radio base stations and core network nodes and can provide them to other systems on request. It can also update the node with a new configuration.

A Network Operations Center (NOC) 16 is a logical entity comprised of multiple smaller entities. The role of the NOC is to request raw information on status of network from OSS, assess whether a Work Order (WO) needs to be created for the FSE to be dispatched and if so, create the order and match an FSE to the WO. The matching process involves the NOC consulting a Field Service Engineer Profile repository database (FSEProf) and characterizing the work order description in order to select and download services for the device or node. Once services are selected, they are sent to OSS, which relays the instruction to the network device or network node.

A Field Service Engineer Profile repository (FSEProf) stores information about the preferences of the FSE, as far as an access interface is concerned. The routine for issuing a WO for a network device and/or node is described in detail in FIG. 11B here below.

Figure 2:
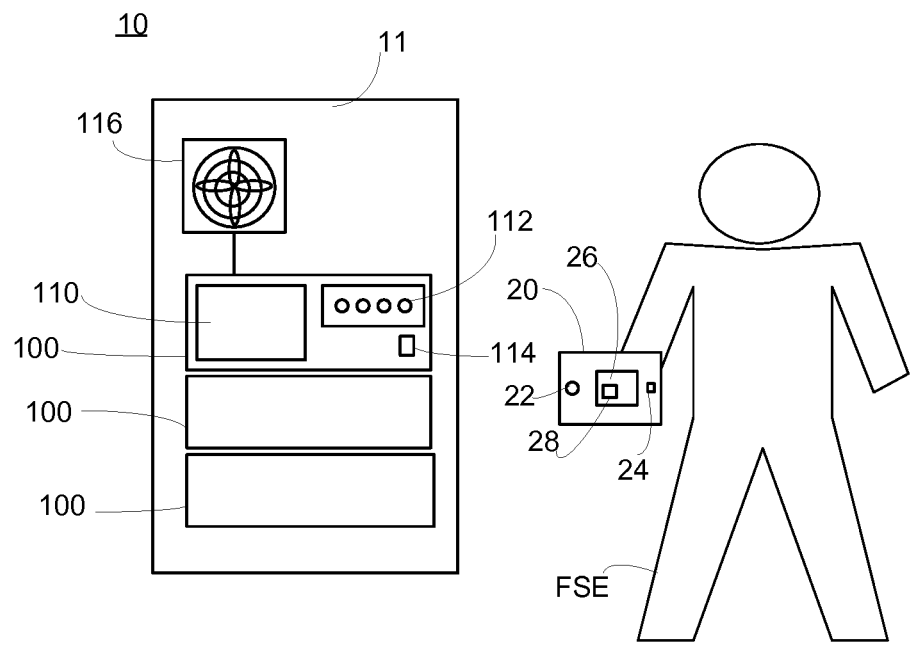
FIG. 2 is a block diagram illustrating an interior of a node housing comprising network devices.

FIG. 2 illustrates the interior of a node housing comprising the network devices.

The housing or cabinet 11 protects the network devices for weather influence and prevents not authorized persons, i.e. intruders, to get access to the network devices. The housing or cabinet may involve racks for stacking the network devices. The network devices 100 comprises electronic components and circuitry, such as controller and power supply unit, basebands unit, radio units, routers, servers, etc. The only persons and users having access to the housing or cabinet are the FSEs trained to perform Operations and Maintenance Service (OMS) and troubleshooting.

The housing or cabinet 11 has at least one fan 116 to stabilize the temperature in the housing or cabinet and providing necessary ventilation and cooling of the electronic circuitry and components of the network devices.

A network device 100 is herein considered to be any network and IT equipment such as routers, switches, servers, but also baseband, power supply and control units, fan control units, radio units, etc. There are a plethora of ways for a maintenance engineer FSE to access, setup or modify their configuration. These "ways" are known in the telecom industry by the term Operations and Maintenance (O&M) interfaces, and they typically require a service terminal device 20 brought by the FSE to connect to the network device, thereby establishing a direct wireless connection. Such connection can be point-to-point, i.e. directly to the network device or node, as is the case in some older serial interfaces, or it can be by getting access to a local network, managed by the network device's or node's interface, which acts as a local gateway.

The service terminal 20 may be any mobile wireless device comprising a controller function 26, i.e. a processing circuitry and a memory comprising instructions executable by the processing circuitry, wherein the instructions are executed for achieving the operation of the controller 26. With processing circuitry is meant at least one CPU 26 or other computing resources. A service terminal may be any suitable wireless mobile device, e.g. cellular mobile device, smart phone, mobile service computer, mobile device tablet, laptop or a tablet or a device with no cellular connectivity. The service terminal preferably comprises at least one of a video camera and microphone 24. The service terminal 20 should also be able to handle, store and execute software applications 28, which are specialized computer programs executable by the processing circuitry.

The network device 100 preferably comprises a controller function 100, i.e. a processing circuitry and a memory comprising instructions executable by the processing circuitry, wherein the instructions are executed for achieving the operation of the controller 26. With processing circuitry is meant at least one CPU 26 or other computing resources.

Said controller 100 is configured to control all or at least some of the operation of the network device 100 and connected equipment, e.g. a fan, one or several light emitting devices 112, etc.

The one or several light emitting devices 112 may be one or several Light Emitting Diodes (LEDs). The one or several LEDs may indicate different operation modes, e.g. power on/off, data traffic on/off, etc. The LEDs may be blinking or having fixed light in one or at least two different colors.

The network device 100 may also comprise a maintenance button 114. When pressing the maintenance button, the network device is set into a maintenance mode, allowing the FSE by means of the service terminal to access and start a communication via e.g. an O&M interface.

For being able to establish a communication, i.e. start up a communication, between a network device and a service terminal, the network device and the service terminal have to be configured with the same access settings for establishing a communication, e.g. over an O&M interface. Said access settings being at least one of:

an Internet Protocol (IP) address;
one or several serial communication parameters;
access protocol;
authentication method.
to be used for establishing a communication.

A valid IP-address, i.e. an IP-address that is valid in the sense that it is assigned to the network device or network node. In terms of communication over TCP/IP links, the IP address of both the FSE's service terminal 20 and the IP address of the network device 100 need to be set before access setup, i.e. establishing a communication between the terminal 20 and the network device 10 starts. IP address assignment can be static, e.g. preconfigured on the network node and terminal device, or dynamic, e.g. the network device or node can run a Dynamic Host Configuration Protocol (DHCP) server and assign an address to the terminal on connection. In the dynamic aspect, several security approaches are in place to prevent a malicious terminal for getting assigned an IP address. Such ways include Media Access Control (MAC) address filtering. A MAC address is unique to every network device, but also key-based authentication. Point-To-Point protocol over Ethernet (PPPoE), also allows authenticated IP address assignment.

Serial communication parameters refers to at least baud rate, parity, flow control, stop and data bit.

Some O&M interfaces are based on the Transmission Control Protocol/Internet Protocol (TCP/IP) network stack as access protocols. In the current state of art, several application layer protocols exist to access the node (e.g. Secure Shell Access—SSH, Telnet, Representational State Transfer—REST over Hypertext Transfer Protocol—HTTP, File Transfer Protocol—FTP, Secure FTP—SFTP, remote login—RLOGIN, etc.). In addition, several physical layer interfaces exist that transfer payloads encoded according to the aforementioned protocols from the engineer's terminal to the network node and vice versa. Examples of such physical layers are Ethernet technologies (for example wired IEEE 802.3x-based protocols (e.g. 100BASE-T, 10GBASE-T or 1000BASE-T, the last one known as Gigabit Ethernet, wireless IEEE 802.11x-based protocols, e.g. 802.11ac). Another legacy type of physical layer technology is Fiber Distributed Data Interface (FDDI), and its token bus and token ring protocols standardized in IEEE 802.4x and IEEE 802.5x respectively (although this became much less popular after introduction of 100BASE-T or "fast ethernet").

An alternative physical interface to use is the serial port in conjunction with a serial port communications protocol such as RS-232. A number of proprietary protocols were built to use the serial port for O&M in the past, while today it is possible to connect modern terminals to legacy RS-232 network nodes over Ethernet and TCP/IP by using a serial to Ethernet converter.

In terms of secure communication, security can be offered on different layers on the network stack, e.g. on application layer with "S" protocols such as SFTP, SSH, HTTPS, etc., but also on network layer with protocols such as IPsec, using for example data encryption, e.g. using public-private keys, or symmetric encryption and authentication.

A number of authentication methods are possible, e.g. token-based, password and PIN-based, biometric, digital identity etc.

It is disclosed herein methods for security at Operation and Maintenance, O&M, support of a network device. A first method is based on a function that once triggered, changes the access setting of the network device or node. The method can function in tandem with current authentication and encryption methods for added security and is better suited for environments where network devices are unattended for long durations of time, for example devices of a Radio Base Stations.

Further a set of reporting methods are disclosed wherein the one or more new access settings of the network device are reported to a service terminal dynamically.

Figure 3:
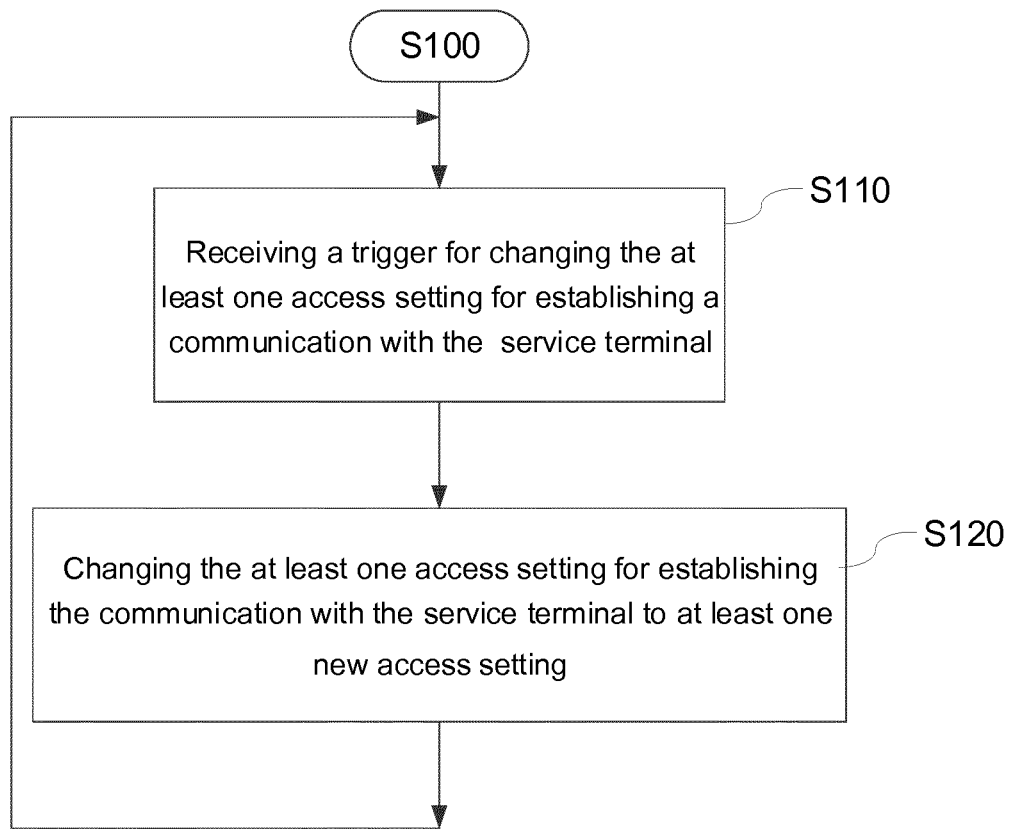
FIG. 3 is a flowchart illustrating a method S100 for access security of a network device.

FIG. 3 is a flowchart illustrating a method S100 for access security of a network device.

The method S100 is a method for access security at Operation and Maintenance, O&M, support of a network device. The network device and a service terminal are configured to establish a communication using at least one access setting for establishing a communication. the at least one access setting comprising one of the following: an IP address, one or several serial communication parameters, access protocol, authentication method, the method comprising:

S110:—Receiving a trigger for changing the at least one access setting for establishing a communication with the service terminal; and S120:—Changing the at least one access setting for establishing the communication with the service terminal to at least one new access setting.

Thus, a network device (100 in FIG. 2) is adapted to receive a special trigger in step S110, which when received by the network device performs the next step, S120, of changing at least one access setting of the communication with the trusted service terminal. Said access setting of the communication is at least one of the following:

A valid IP-address;
Serial communication parameters;
access protocol of the network device or node;
authentication method.

The trigger for changing the at least one access setting for establishing the communication is at least one of the following:

Reception of an Update Service Access request from an Operation Service Support system, OSS;
Operation fault or security alarm generated in the network device;
Performance degradation of the performance of the network device;
Attachment of a service terminal;
Start signal activated by a Field Service Engineer (FSE).

Figure 4A:
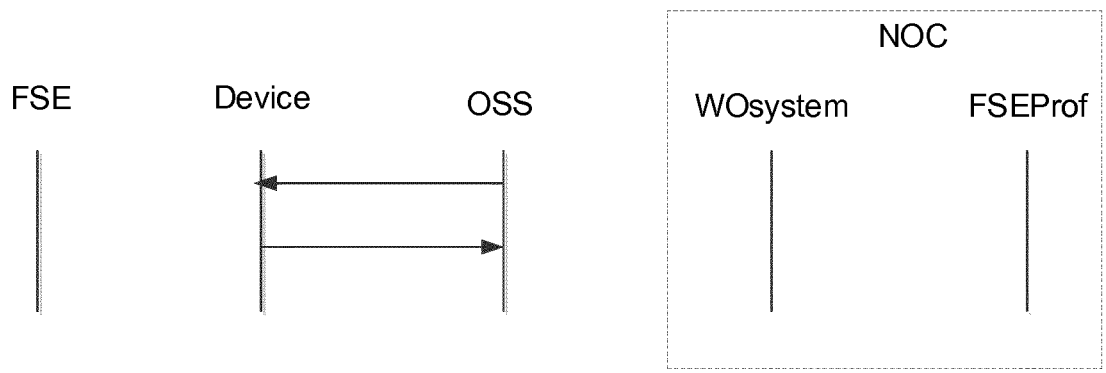
FIGS. 4A-4D are sequence and signaling schemes illustrating the data traffic between different entities of a system.

FIG. 4A is a sequence and signaling scheme illustrating the data traffic between a network device in a network node and an Operation Support System, OSS.

The OSS performs continuously monitoring and analysis of the network devices and network nodes status and operation in a network. It is a loop between a network device or node and the OSS of status updates, e.g. alarms, Performance Monitoring/Metric (PM) counters, Key Performance Indicators (KPIs), etc. The PM counters monitor various parameters of the network devices and equipment. The parameters monitored can be e.g. current and historically average throughput, number of active and idle mobile subscribers, current and historically average power consumption, CPU/memory consumption, temperature, etc. The parameters are measured and used for calculating higher level metrics like KPIs. The KPIs are usually a standardized set of metrics showing network-level or service-level performance. These are used to monitor a network and network devices since PMs are most often too low-level. An example of a KPI could be network device or node utilization, which would combine number of subscribers and throughput in one measurement. Typically, the NOCs monitor the KPIs and if something is wrong in a KPI, the PM counters and corresponding PM parameters are investigated. The OSS sends request regarding operation information of the network devices or nodes, e.g. the radio base station and core network nodes, and the network device or node responds with the requested information. The OSS can provide the information to other systems on request. It can also update the network device and node with new configuration settings.

Figure 4B:
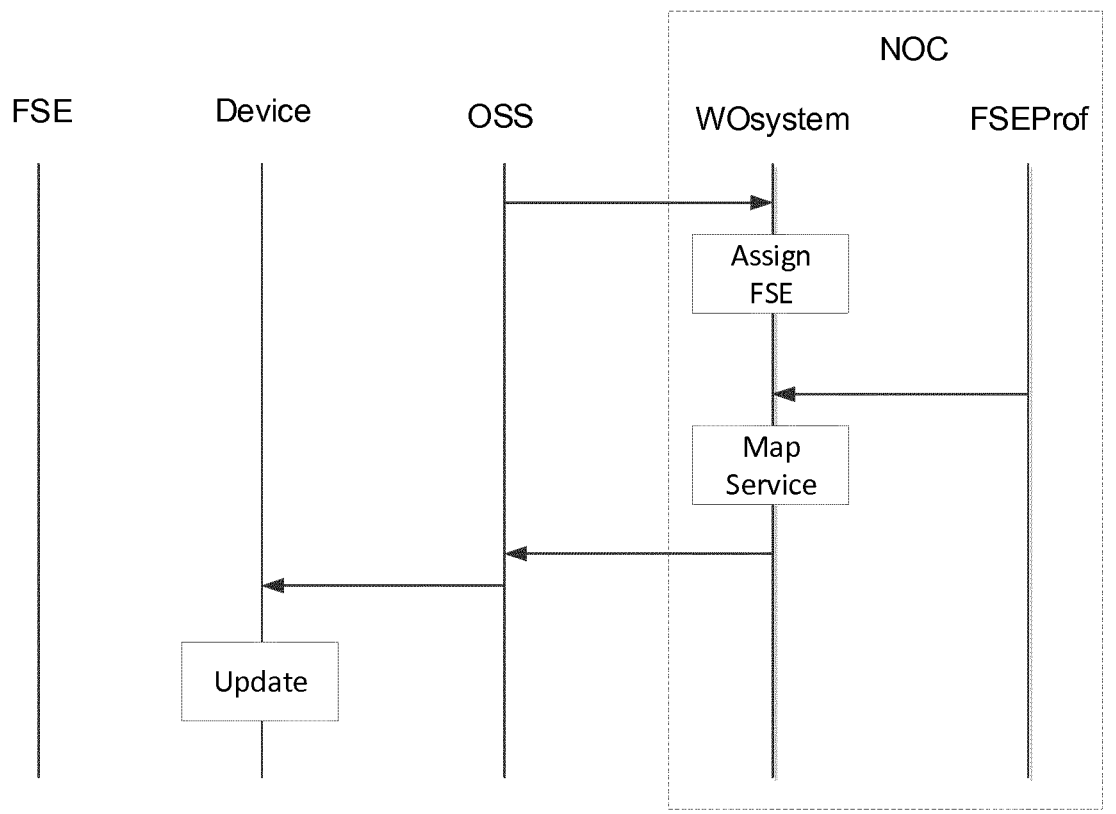

FIG. 4B is a sequence and signaling scheme illustrating the transfer of a working order (WO). Said WO will start the triggering of a change of access settings of a network device and a node.

When a new WO is issued by the OSS for a network device or network node, the WO gets a Working Order identifier (WOid). Said WO is sent to the WOsystem of the Network Operation Center, NOC. At some point, e.g. after diagnosing an issue or after regular site maintenance, NOC, which is monitoring the OSS decides that a new work order should be created based on the status information received. The WO comprises a service description to be performed.

At this point, OSS retrieves information about the FSE personal preferences for accessing the network device or network node. The WOsystem fetches a user profile, FSEid, and receives the preferences of said FSEid from the FSEProf. This information may include:

The location of the network device as well as its owner (as there might be policy rules pertaining to what IP address range has to be used depending on location and/or the owner of the equipment—e.g. a mobile network operator); and the access settings such as:

IP address: It is also possible for explicit mentioning of a preferred IP address or range of addresses (expressed for example, using Classless Interdomain Routing—CIDR notation—i.e. 192.168.0.0/24);

Serial communication parameters;

Access protocol identification: A preferred access protocol description (the description can be hierarchical, e.g. in descending order of preference). The protocol stack is a list of protocols used and can be described by a well-known format such as Internet Assigned Numbers Authority's, IANA's, protocol number [https://www.i-ana.org/assignments/protocol-numbers/protocol-numbers.xhtml], or even Internet Engineering Task Force Requests for Comments, IETF's RFC, identifier [https://www.iettorg/download/rfc-index.txt]. In addition, preferred port range for the access protocol, where applicable;

Optionally there can even be some preference on the authentication method (e.g. using corporate Lightweight Directory Access Protocol (LDAP) directory or hardcoded password—the latter assumed to be known a priori from the FSE). Finally, there could be some preference even on the username used to access the network device or node (e.g. specific username that the FSE uses in other systems—for example signum).

The WOsystem then maps the preferences of the FSE. The analysis of the work order is done manually, based on the input information provided. The work order is subsequently assigned to an FSE.

The WOsystem then issues an Update Service Access Request comprising the access settings to be used, the service description and the FSEid. The Update Service Access Request is sent to the OSS, which relays the request to the network device or node in question, which is identified by means of the information in the request. The correct network device or node receives the request, which triggers an update of the network device or node of the access settings. The update may therefore result a change of at least one access setting if the request comprises at least one new access setting compared to the present access settings used by the network device or node. Said received access settings will be used when the identified FSE arrives to the network device or node for performing the requested service.

Figure 4C:
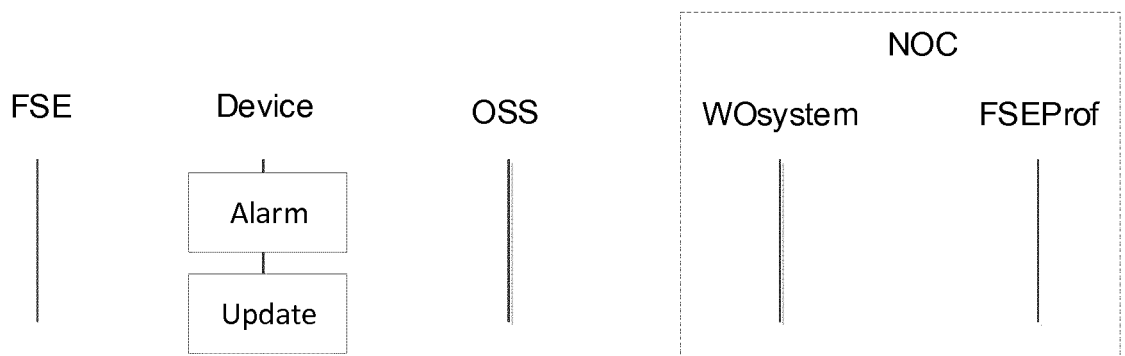

FIG. 4C is a sequence and signalling scheme illustrating when a trigger is issued by an alarm situation in the network device or node. Alternatively, update or change of the access settings can be triggered by a critical alarm on the network device or node, e.g. fault on the device or node. A corner case could be detection of a cabinet breach, e.g. by a malicious user. In this case, the network device or node can change its IP address immediately, or completely disable all local access to the device or node.

Figure 4D:
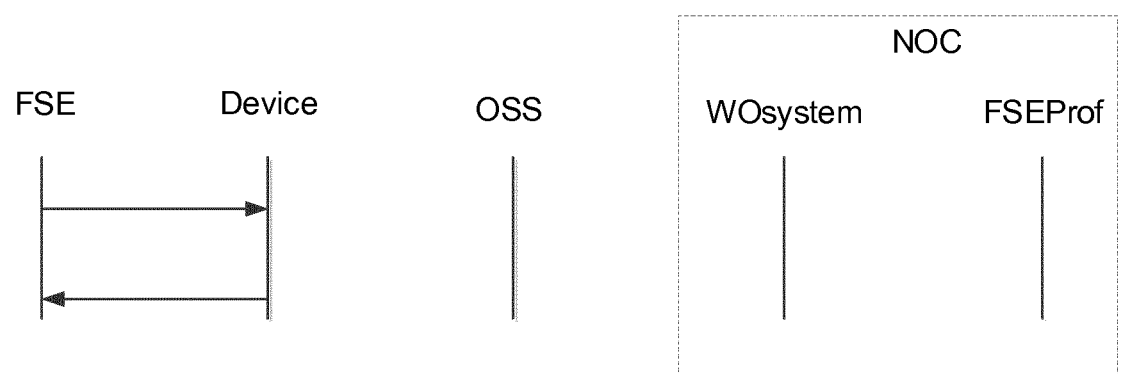

FIG. 4D is a sequence and signalling scheme illustrating when an FSE arrives at the network device or node to be troubleshooted.

The next step of the process involves initiation of the reporting mechanism. By "reporting mechanism" it is herein meant the fact that the network device uses some type of protocol stack to inform the service terminal (20 in FIG. 2) of the FSE about the change of at least one access setting. Initiation of the mechanism can be done a priori, e.g. upon triggering of the update, remotely from a human in the NOC, or by the FSE when they arrive on site by pressing a button on the network device. For example, some manufactures have already a maintenance button (114 in FIG. 2), which is used for servicing operations. Pressing said button could trigger the reporting mechanism also.

Figure 5:
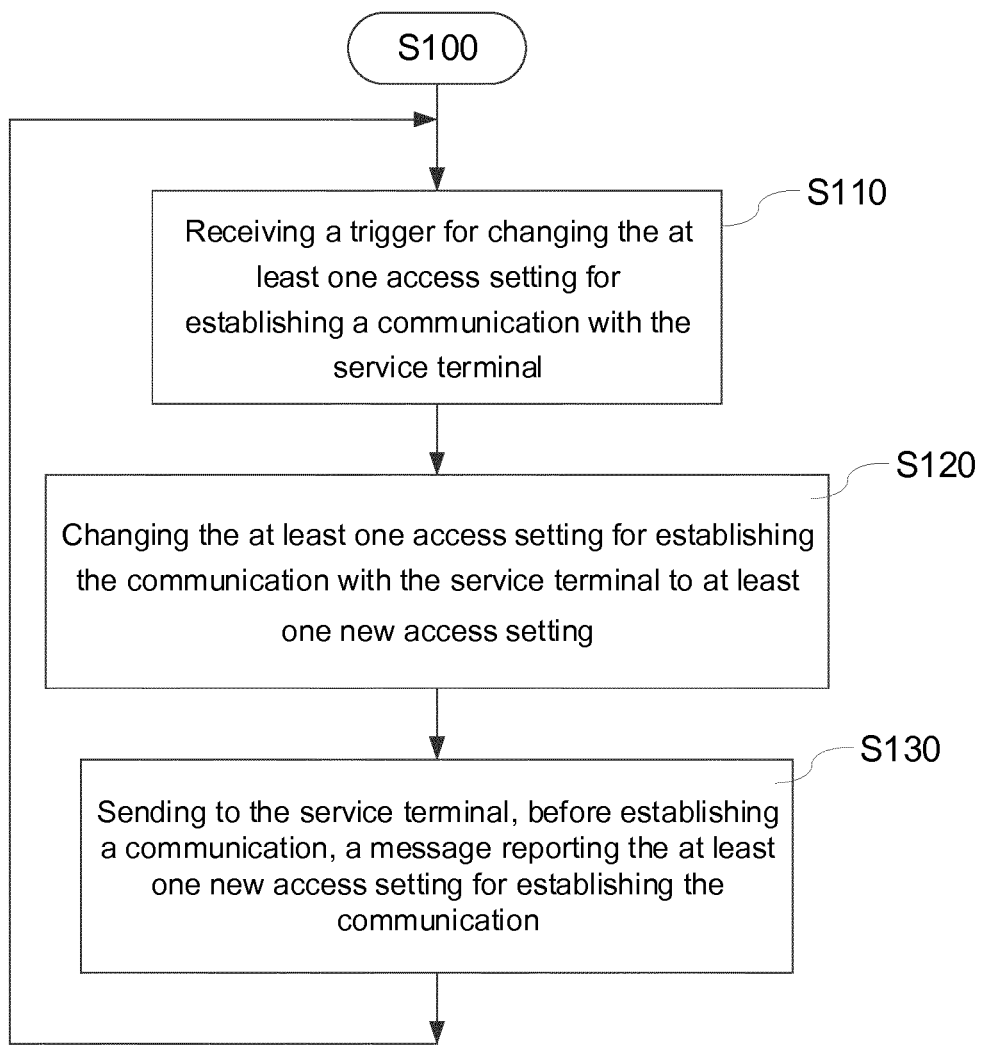
FIG. 5 is a flowchart of the method S100 comprising a reporting step.

FIG. 5 is a flowchart of the method S100 comprising a reporting step. Thus, the method may further comprise a step of:

S130:—Sending to the service terminal, before establishing the communication, a message reporting the at least one new access setting for establishing the communication.

As the service terminal and the network device are not able to establish a communication over an ordinary interface, e.g. an O&M interface due to the changed access settings of the communication interface, the network device has to be able to report the new access settings in some way. The network device is therefore configured to generate a message comprising the at least one new access setting for establishing the communication when an FSE arrives to the network device and initiate the O&M support activity.

Figure 6:
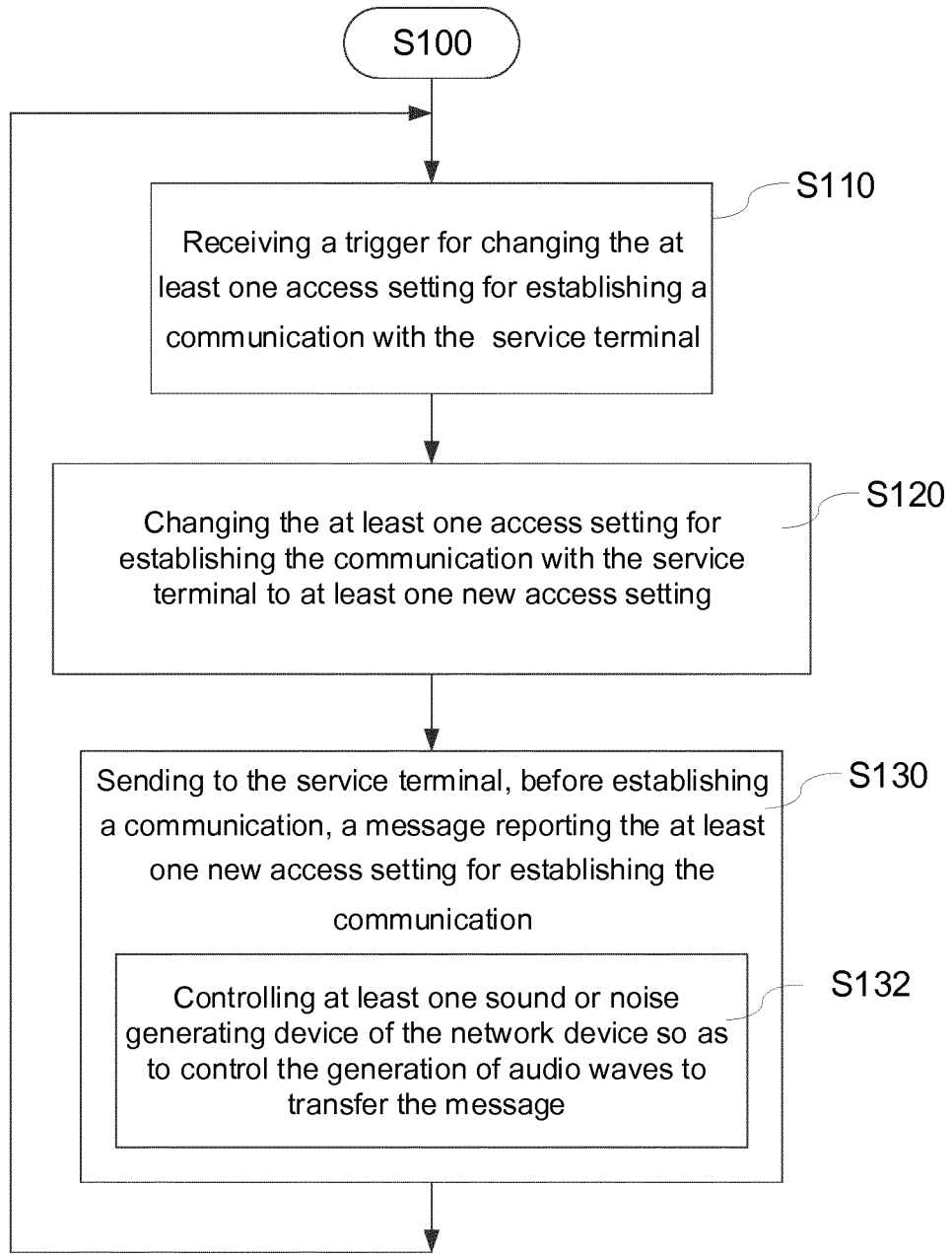
FIG. 6 is a flowchart illustrating one embodiment of the method S100 wherein audio waves are used.
Figure 8:
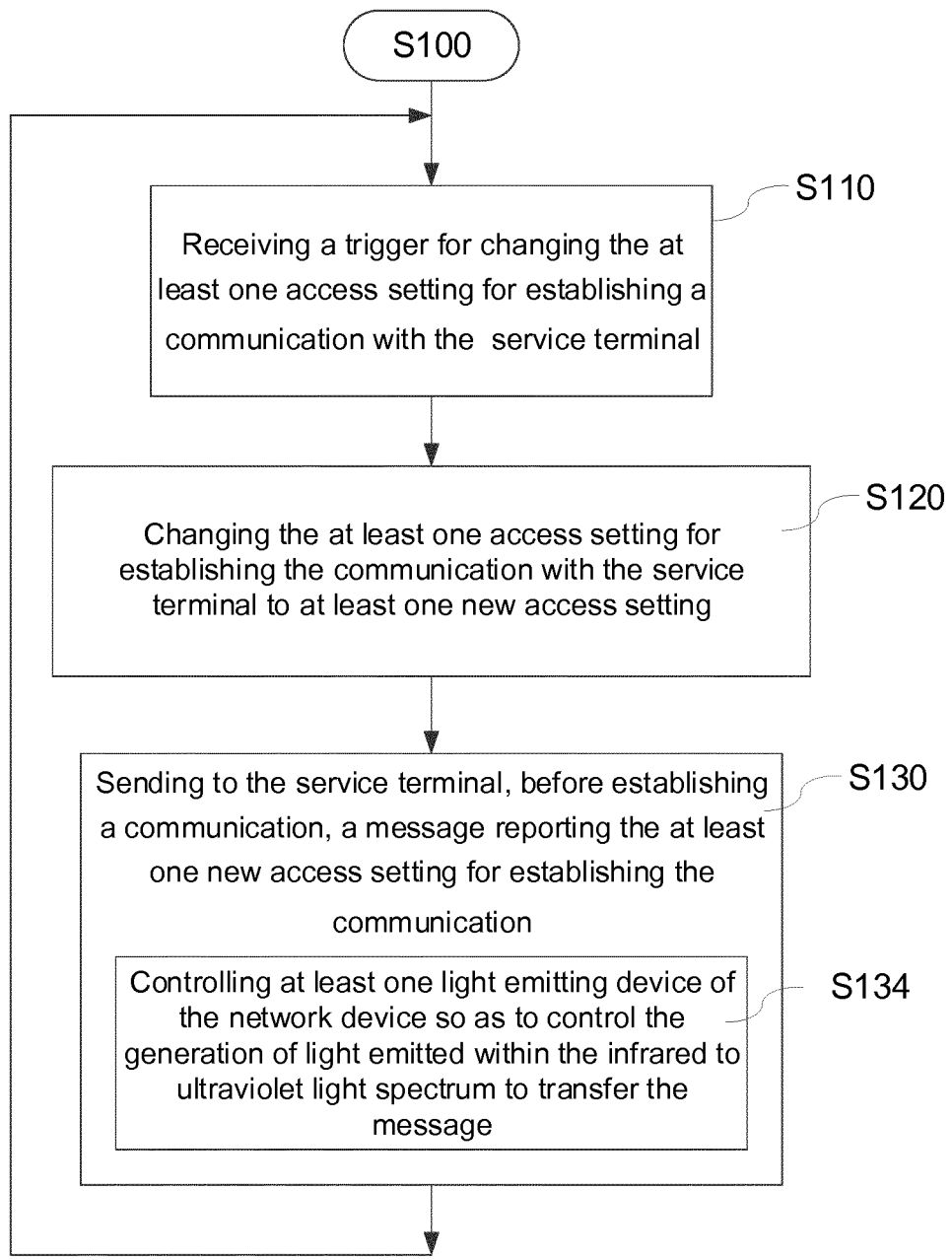
FIG. 8 a flowchart illustrating one embodiment of the method S100 wherein light is used.

It is therefore herein provided different report mechanisms, which is described herein with reference to FIGS. 6 and 8.

FIG. 6 is a flowchart illustrating one embodiment of the method S100 wherein audio waves are used.

According to the embodiment illustrated in FIG. 6, the method comprises the step of:

S132:—controlling at least one sound or noise generating device of the network device so as to control the generation of audio waves to transfer the message.

Thus, before establishing the communication, the message reporting the at least one new access setting for establishing the communication is sent by controlling at least one sound or noise generating device of the network device to control the generation of audio waves to transfer the message to the service terminal.

According to one embodiment, the controlling at least one sound or noise generating device of the network device, so as to control the generation of audio waves to transfer the message, is performed by using digital modulation. Said control is preferably performed by using a controller (110 in FIG. 2) of the network device. Different methods of digital modulation can be used.

Said embodiment may be enabled in different ways by means of at least one sound or noise generating device. An example of such a noise generating device is a cooling fan of the network device or node. Such noise generating device may be already present in the standard node equipment and the device is suitable for the purpose if it is controllable by a controller. Cooling fans (116 in FIG. 2) of the node equipment are controlled by a controller (100 in FIG. 2) and are considered as standard equipment in a network node to cool the electronic circuitry of the network devices. Such fans are therefore considered as suitable to be controlled in a way that the variation of the velocity of the spinning fan blades generates a variation of the sound or noise that can be registered and/or recorded, wherein the variations of the sound or noise could be transformed into the sent access information by means of a software application stored and executed by the service terminal comprising data processing resources.

Assuming the fans are controlled via a Pulse Width Modulated (PWM) control signal duty cycle, with a common control frequency of 5-50 kHz.

As an example, fan speed range for common data center server equipment is in the range of 700-10000 RPM, giving ample space to modulate multiple symbols within the range. As an example, for representing four symbols the speed range is divided into speed interval 700-2000 RPM representing symbol S1, 3000-5000 RPM representing S2, 7000-10000 RPM representing S3, and 12000-15000 RPM representing S4. The actual assignment of symbols can be chosen appropriately based on sound pressure, symbol separation, etc.

In a worst case where the cooling requirements of the equipment require that fans run at full speed, we can assume that we can encode only two symbols, e.g. S3 and S4 at the high RPM range, by briefly changing the fan speeds. The frequency response of the microphones in a mobile phones is best for the human voice frequency band (approx. 300-3400 Hz), but is safe to assume that signals 500-15000 Hz will be picked up.

In order to estimate the available transfer bitrate, it can be assumed that the change of fan control signal duty cycle will take effect after several rotations of the fan motor. At 700 RPM, one revolution is 1.5 ms, a conservative estimate is that it may take up to 50 ms until an audible change of sound can be picked up by the microphone, resulting in 20 bits/s transfer speed. Transfer of a 105-bit packet at this conservative estimate would take up to 6 seconds, making it a feasible low bit-rate communication channel.

Figure 7:
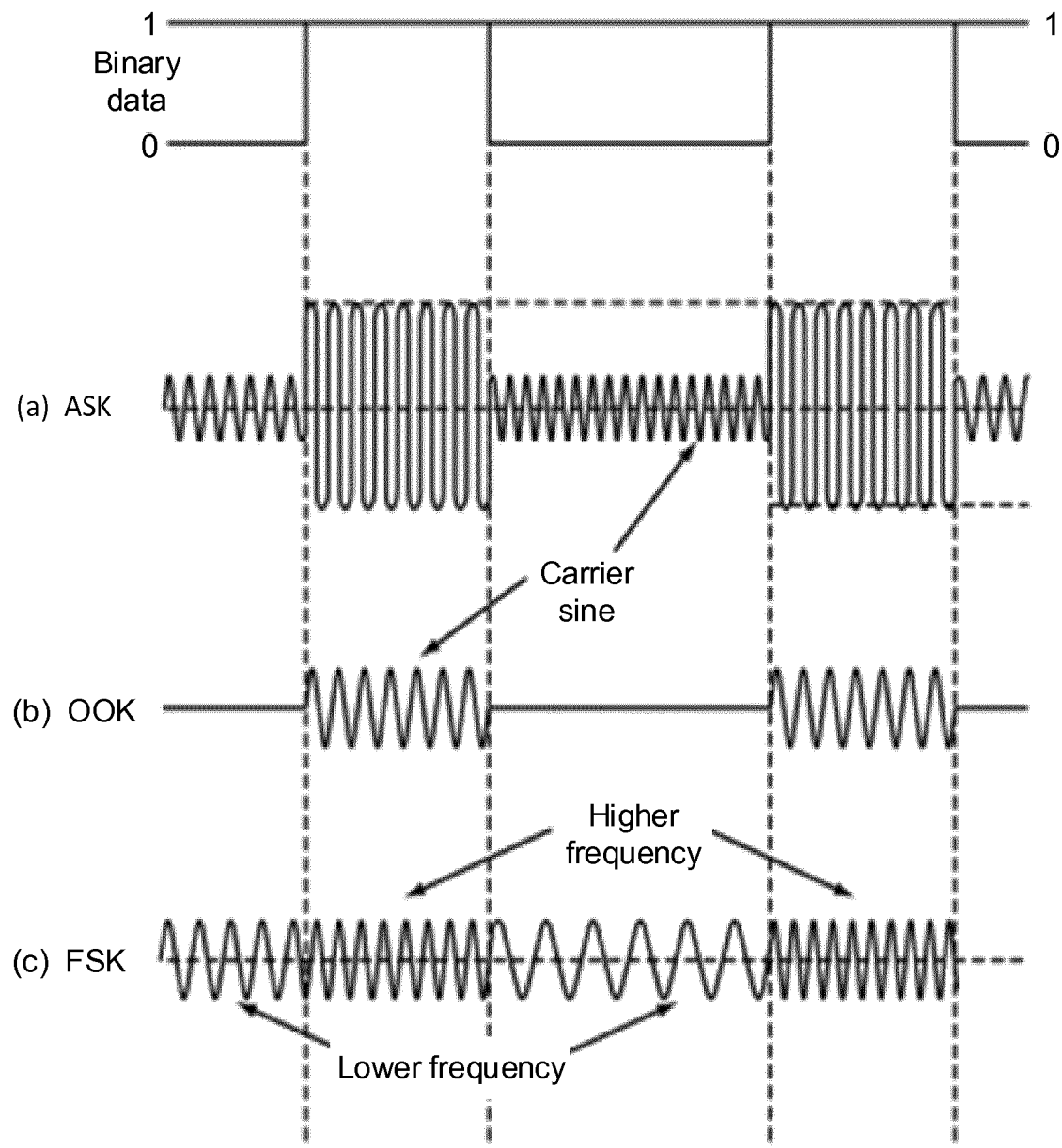
FIG. 7 illustrates different types of digital modulation when generating audio waves.

FIG. 7 illustrates different types of digital modulation when generating audio waves.

The way information is transferred in an analog audio waveform is known as "digital modulation". In digital modulation, the analog audio wave is modulated by a discrete signal. Thus, the analog audio waves are used as "carrier signal". There are several techniques for doing digital modulation, for example shifting of carrier amplitude: a) Amplitude Shift Keying (ASK), b) Frequency by means of Frequency Shift Keying (FSK) or c) simply on-off keying (OOK).

A straightforward way would be to shift the amplitude using fans to increase the loudness, i.e. by spinning the RPM of the fan up.

Another way to modulate the generated audio waves to carry the access information to the service terminal is to use a loudspeaker or beeper device if available in the housing or cabinet (11 in FIG. 1). A loudspeaker or beeper device is connected to the controller (100 in FIG. 2) via a sound system, which amplifies the electric signal comprising the access information and transduces the signal into variation of the generated audio (waves) of different amplitude or frequency. These can be generated in the supersonic or subsonic part of the spectrum so they are inaudible to the human ear but can still be captured by a microphone of the mobile device, such as a service terminal. The variations of the sound or audio waves could be transformed into the sent access information by means of a software application stored and executed by the service terminal comprising data processing resources.

FIG. 8 a flowchart illustrating one embodiment of the method S100 wherein light is used.

According to the embodiment illustrated in FIG. 8, the method comprises the step of:

S134:—controlling at least one light emitting device of the network device so as to control the generation of light emitted within the infrared to ultraviolet light spectrum to transfer the message.

Thus, before establishing the communication, the message reporting the at least one new access setting for establishing the communication is sent by controlling at least one light emitting device of the network device so as to control the generation of light emitted within the infrared to ultraviolet light spectrum to transfer the message to the service terminal.

According to one embodiment, the controlling of at least one light emitting device of the network device is preferably performed by using a controller (110 in FIG. 2) of the network device.

The at least one light emitting device may preferably be originally meant for indicating operation of the network device. The at least one light emitting device may be a Light Emitting Diode, LED.

Examples of such a light emitting devices are a diode or lamp indicating power on/off, operation mode or data traffic on input port or output port is present. Thus, at least one LED may be present in the standard node equipment and a LED is suitable for the purpose if it is controllable by a controller. Light emitting devices (112 in FIG. 2) of the network device or node equipment are controlled by a controller (100 in FIG. 2) and are considered as standard equipment of the network device or in a network node. In general, network equipment uses LEDs to report status, e.g. a green LED that is ON may indicate that everything is fine, a blinking LED might indicate that a device is booting whereas an LED that is red may indicate an issue with the equipment.

Such LEDs are therefore considered as suitable to be controlled in a way that the variation of the light from at least one LED can be registered and/or recorded, wherein the variations of the light could be transformed into the sent access information by means of a software application stored and executed by the service terminal comprising data processing resources. In this embodiment, at least one LED is controlled in order to report status information using a Visual Light Communication (VLC) protocol to a service terminal.

The message reporting the at least one new access setting for establishing a communication, the message having a packet structure comprising at least a packet prefix, an IP address, an access protocol identifier, and an authentication method identifier.

The reporting mechanism also takes advantage of the fact that the service terminal is a wireless device comprising a video camera and/or a microphone for receiving the light and/or audio waves being used for transferring the message.

A method S200 performed by the service terminal is provided. The method S200 is corresponding to the method S100 performed by the network device.

Figure 9:
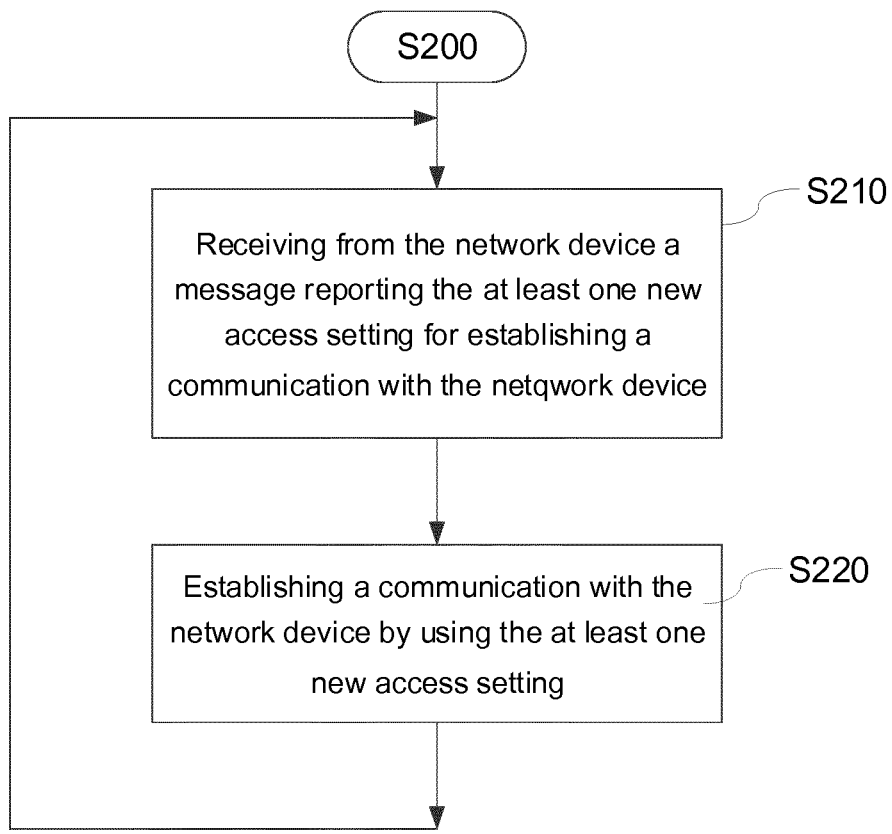
FIG. 9 is a flowchart of a method S200 performed in a service terminal.

FIG. 9 is a flowchart of a method S200 performed in a service terminal.

The method S200 is performed by a service terminal for access security at Operation and Maintenance, O&M, support of a network device. The network device and the service terminal are configured to establish a communication using at least one access setting for establishing a communication. The at least one access setting comprising at least one of the following: an IP address, one or several serial communication parameters, access protocol, authentication method. Further, the at least one access setting for establishing a communication with the service terminal is changed to at least one new access setting. The method comprises the steps of: S210:—Receiving from the network device a message reporting the at least one new access setting for establishing a communication with the network device; and S220:—Establishing a communication with the network device by using the at least one new access setting.

When the service terminal has received the message reporting the at least one new access setting for establishing a communication with the network device, the service terminal has the access settings for establishing a communication via the communication interface, such as a wireless link, with the network device. Said interface may be an O&M interface. However, it is not possible to use said communication interface for sending the message comprising the at least one new access setting for establishing a communication. As already mentioned in this disclosure, it is therefore suggested different report methods or "report mechanism" for transferring the message from the network device to the service terminal, as mentioned above.

According to one embodiment, the network device is configured to control at least one sound or noise generating device of the network device so as to control the generation of audio waves to transfer the message, see S132.

Figure 10:
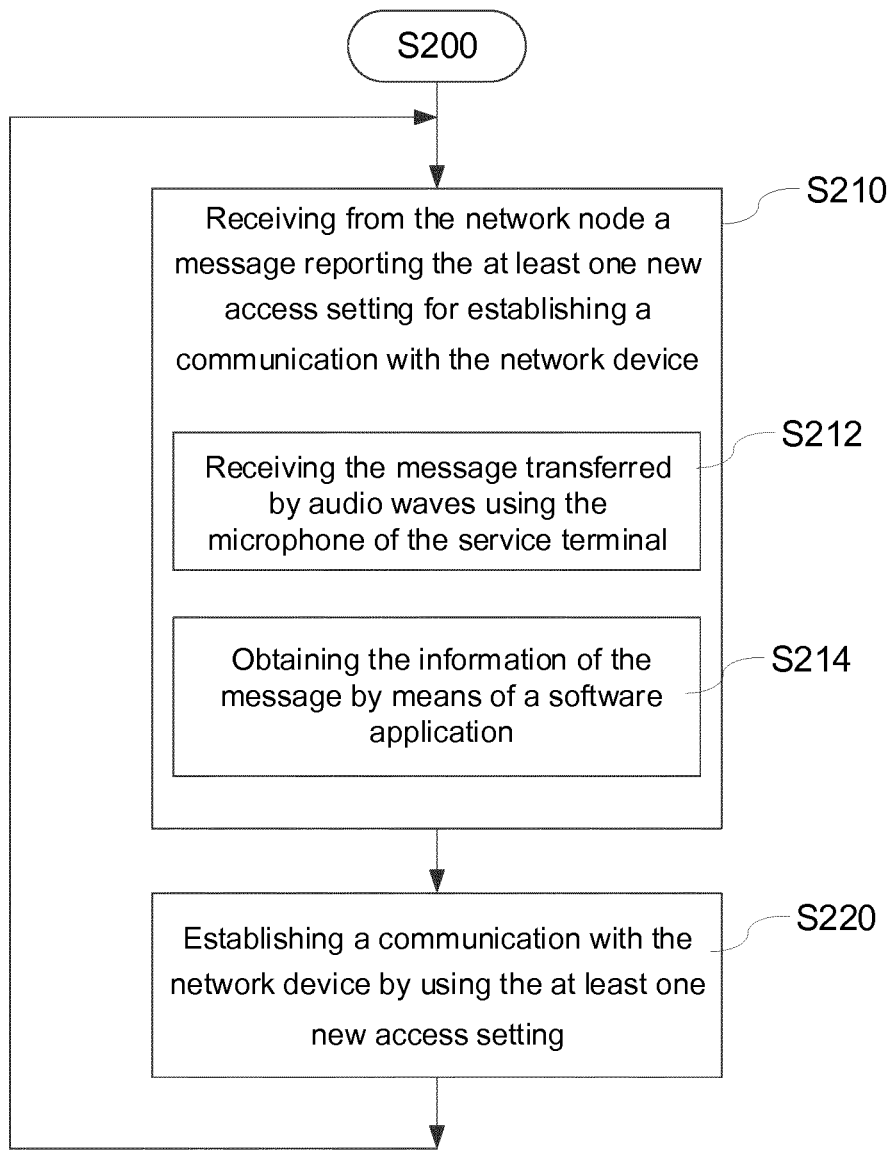
FIG. 10 is a flowchart illustrating one embodiment of the method S200.

FIG. 10 is a flowchart illustrating one embodiment of the method S200.

This embodiment of the method S200 is enabled if the service terminal is a wireless device comprising a microphone. The receiving from the network device of a message reporting the at least one new access setting for establishing a communication comprises:

S212:—receiving the message transferred by audio waves using the microphone of the service terminal;

S214:—obtaining the information of the message by means of a software application.

The techniques for transferring the message via audio waves has been described above. The microphone is used to receive and transduce the digitally modulated audio waves by means of its standard built in microphone. The audio waves are digitally modulated to comprise the message and the modulated audio waves are transduced into modulated electric signals. The modulated electric signals carrying the message are demodulated and the information of the message, i.e. the at least one new access setting for establishing a communication, is obtained by means of a software application stored in the service terminal.

Figure 11:
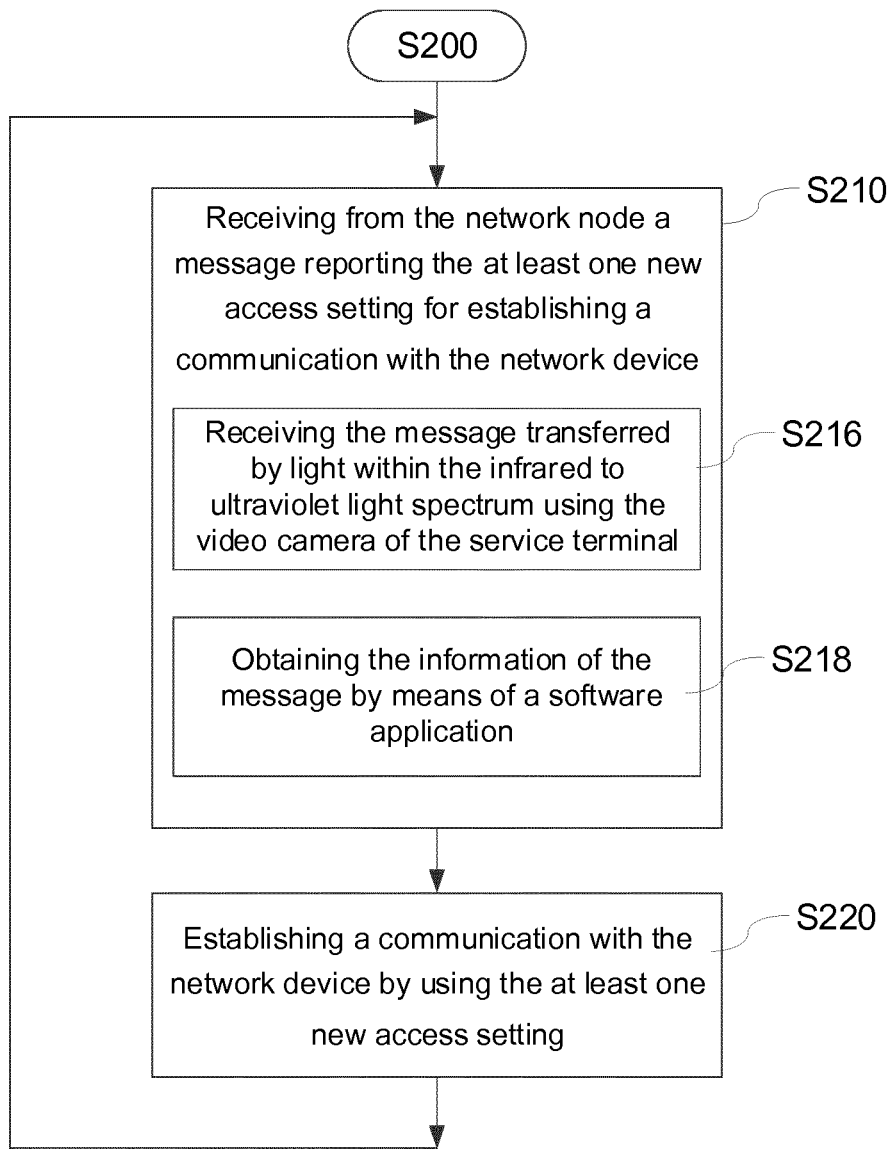
FIG. 11 is a flowchart illustrating another embodiment of the method S200.

FIG. 11 is a flowchart illustrating another embodiment of the method S200.

In this embodiment, the network device is configured to control at least one light emitting device of the network device so as to control the generation of light emitted within the infrared to ultraviolet light spectrum to transfer the message, see step S134.

This embodiment of the method S200 is enabled if the service terminal is a wireless device comprising at least a camera, preferably a video camera. The receiving from the network device of a message reporting the at least one new access setting for establishing a communication comprises the steps of:

S216:—receiving the message transferred by light within the infrared to ultraviolet light spectrum using the video camera of the service terminal;

S218:—obtaining the information of the message by means of a software application.

By means of the camera, preferably a video camera, the service terminal is capable of registration and recording of images in a suitable file format, images of the at least one light emitting device in different states. The message will be transferred by the light emitting devices during a message transfer time, wherein a number of consecutive image frames are registered and recorded. The information content of the message is obtained by means of a software application stored in the service terminal. Said software application is programmed to interpret the number of frames comprising the transfer of the message.

In the following example, the light emitting device is selected to be a Light Emitting Diode (LED). One critical feature is the synchronization of the camera's frame rate in relation to the bitrate of the LED. The reason for bitrate not patching performance of camera (i.e. 30 bits per second as described above), is because the camera shutter is desynchronized from the blinking of the LED. This could mean that when the camera of a mobile device captures a new frame, the new frame shows the LED in a semi-on state, meaning that it is hard to deduce whether the LED is blinking or not.

On average, the bitrate of the LED is a third of camera's frames per second (FPS) capability, for a single LED. This is because the camera update rate is not synchronized with the blinking of the LEDs, which means that in some frames the LED may be half-lit, either because it is turning off or because it turns back on. Therefore, more than one frame is needed to safely capture a state. If the is standard for a generic camera found in any reasonably modern phone is 30 FPS, at least three images are needed to secure the capture of a state. This would yield a transfer rate of 10 bits per second. This would mean that it would take 4.6 to 10.5 seconds to transmit the needed information which is a reasonable amount of time for an FSE to be holding the phone against the network equipment's LED.

Figure 12:
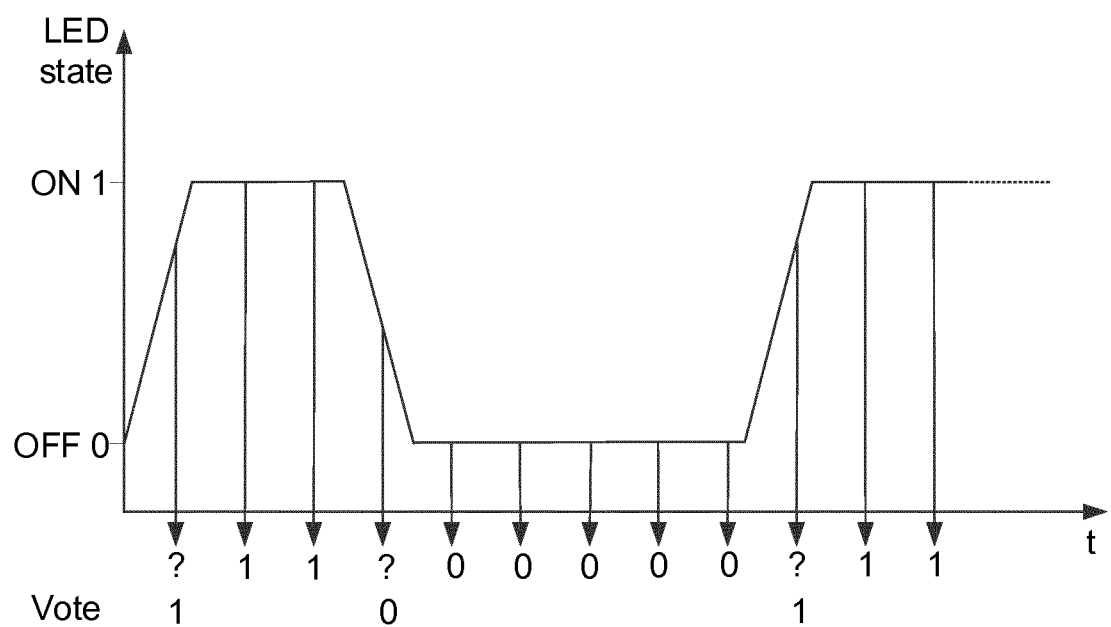
FIG. 12 is a diagram illustrating the LED State in relation to the sampling of a video camera.

FIG. 12 is a diagram illustrating the LED State in relation to the sampling of a video camera. Due to the frame rate of the camera and the transient time it takes for a LED to switch states, some of the camera frames will be captured between the ON state where the LED is fully lit, indicating bit value "1", and the OFF state where the LED is switched off, indicating bit value "0". In the transit time, it appears that the captured frame is half-lit. A voting system is therefore suggested to be used, in which the voting system uses 3 consecutive frames to deduce whether the bit is 0 (LED OFF) or 1 (LED ON).

As described above, the mechanism uses either light or audio as physical medium. If light is used, then the light emitting devices that almost every network device or node has in its fascia can be used to transmit changed IP address and access methods. If audio is used, then fans of the device or node can be span up and down in order to transmit at certain frequency audio mapping to 0 and 1 bits. For example, fans speeding twice or once, or fans speeding on lower or higher RPMs (thus creating sound with different frequency). The message used for reporting the at least one new access setting for establishing a communication is generated by the network device and the message has a packet structure comprising at least a packet prefix, an IP address, an access protocol identifier, and an authentication method identifier.

The packet structure of the message, may be in the order (starting up to the left) as follows:

[Packet Prefix] [IP Address] [Access Protocol Identifier] [Authentication Method Identifier] [Username] [Checksum]

Packet Prefix is a unique combination of bits indicating start of packet, e.g. it could be four bits such as 0110.

At least one of the following two headers also exist in the packet, depending on whether the network device or node needs to change its IP address or access protocols or both:

IP address is the IP address to change. As connection to FSE is always private, then only the private IPv4 network ranges are assigned:

Assuming that the first two bits show which CIDR block is used, then the next 24 bits show which specific IP address is assigned—so 26 bits in total.

TABLE 1

| Address Block | Address Range | Number of Addresses | Allocation Date from Internet Assigned Numbers authority (IANA) |
|---|---|---|---|
| 10.0.0.0/8 | 10.0.0.0-10.255.255.255 | 16.777.216 | February 1996 |
| 172.16.0.0/12 | 172.16.0.0-172.31.255.255 | 1.048.576 | February 1996 |
| 192.168.0.0/16 | 192.168.0.0-192.168.255.255 | 65.536 | February 1996 |

Subsequently, the access protocol is described. The access protocol defines what type of access the network device or node will expose and at which port. It consists of triplets of <interface identifier, protocol identifier, configuration information>. An interface identifier identifies whether the physical layer interface, e.g. ethernet, serial, WIFI, etc. The protocol identifier describes the application-layer protocol or application used (e.g. SSH, FTP, telnet, but also moshell, element manager, etc.). Finally, the configuration information are dependent on the interface, e.g. in case of ethernet, configuration can be the port number a service is running on, whereas in case of If no access "triplets" are provided, then the network device or node does not expose any access to FSEs (e.g. in case of malicious user detected, as described previously.

An optional authentication method header indicates how the user will authenticate, e.g. using an LDAP directory or a hardcoded local password. This header could be 3-bit describing 8 alternative methods of authentication.

Table 2 below is a listing of possible combinations of interface, protocol identifier, configuration information.

TABLE 2

Different network interfaces, remote access protocols and their configuration options.

| Network Interface (Family Type) | | Configuration [Interface] | Protocol ID | Configuration [protocol] |
|---|---|---|---|---|
| Ethernet (IEEE 802.4x) | 100BASE-T 10GBASE-T 1000BASE-T | — | SSH TELNET RLOGIN FTP SFTP | Username, Port, Timeout, Key (for SSH, SFTP) |
| WIFI (IEEE 802.11x) | 802.11b 802.11n 802.11ac 802.11r . . . | Access (SSID, Password) Range (900 MHz, 2.4 GHz, 3.6 GHz, 4.9 GHz, 5 GHz, 5.9 GHz, or 60 GHz Channel (1-14) . . . | VNC RDP RSH Teamviewer | Username, Port, OS (window/linux), Window Manager (If linux, e.g. XFCE) Two factor Authentication, SSL/TLS Secure Connection, Username, Port Username, Password Partner ID, Control (remote control/file transfer), . . . |
| Serial | RS-232 RS-520 RS-422 . . . | Baud Rate (e.g. 9600) Data Bits (e.g. 8) Stop Bits (e.g. 1) Parity (e.g. odd) Flow control (e.g. XON/XOFF) | CITRIX, Anydesk, Chrome Remote Desktop, NoMachine, X2go, Moshell, . . . | Username, Password, . . . |

Note that there may exist configuration options for both the network interface and the access protocol (in which case one is appended to the other in the packet payload).

In addition, a username is optional, in case one or more of the access protocols require credentials to login, and user prefers to use their own username. A username can be several bytes long, in case of Ericsson 7 bytes=56 bit.

Finally, a mandatory checksum is also present to increase reliability of transmission. One sample checksum size is 16-bit (CRC-16)

The total estimate of the packet size ranges from 46 to 105 bit. In the next section, we describe how feasible it is to transmit such information in a reasonable amount of time.

The methods S100 and S200 may be implemented in digital electronically circuitry, or in computer hardware, firmware, software, or in combinations of them. The methods may be implemented in a computer program product tangibly embodied in a machine readable storage device for execution by a programmable processor; and method steps of the methods may be performed by a programmable processor executing a program of instructions to perform functions of the invention by operating on input data and generating output.

The methods S100 and S200 may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Thus, it also provided, a computer program comprising computer program code which, when run in a processing circuitry (100 in FIG. 2) of a network device, causes the network device to perform the steps of the method S100. Further, it is provided a computer program product comprising the computer program and a computer readable means on which the computer program is stored. In addition, it is provided a carrier containing the computer program, wherein the carrier is one of an electronic signal, optical signal, radio signal or computer readable storage medium.

It is also provided, a computer program comprising computer program code which, when run in a processing circuitry of a service terminal (20 in FIG. 2), causes the service terminal to perform the steps of the method S200. It is further provided a computer program product comprising the computer program and a computer readable means on which the computer program is stored. In addition, it is provided a carrier containing the computer program, wherein the carrier is one of an electronic signal, optical signal, radio signal or computer readable storage medium.

Figure 13:
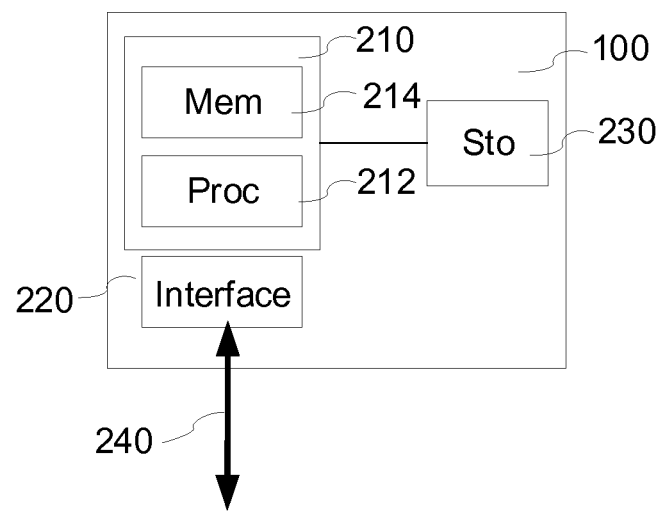
FIG. 13 is a block diagram illustrating one implementation of a network device.

FIG. 13 is a block diagram illustrating one implementation of a network device.

The network device 100 comprises at least one processing circuitry 210 comprising a processor unit 212 and a memory 214. The network device further comprises one or several interfaces 220 for enabling input and output communication 240 with e.g. user equipment (UE) such as a service terminals, etc. The network device may also comprise computer readable means or computer readable storage medium 230 on which computer program is stored. Said means or medium 230 may be fixed in the network device or network node or removable. Generally, a processing circuitry 210 will receive instructions and data from a read-only memory and/or a random access memory, such as memory 214. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially designed ASICs (Application Specific Integrated Circuits).

The network device 100 is configured for enabling access security at Operation and Maintenance, O&M, support. The network device and a service terminal are configured to establish a communication 240 using at least one access setting for establishing a communication. The at least one access setting comprises at least one of the following: IP address, one or several serial communication parameters, access protocol, authentication method. The memory 214 comprises instructions executable by the processing circuitry 210, wherein the instructions when executed by the processing circuitry cause the network device to receive a trigger for changing the at least one access setting for establishing the communication with the service terminal and change the at least one access setting for establishing the communication with the service terminal to at least one new access setting. The trigger for changing at least one access setting for establishing communication is at least one of the following:

Reception of an Update Service Access request from an Operation Service Support system (OSS);
    Operation fault or security alarm generated in the network device;
    Performance degradation of the performance of a network device;
    Attachment of a service terminal;
    Start signal activated by a Field Service Engineer (FSE).

The Update Service Access request comprises at least one of the following: location information of the network device, preferred valid IP address or preferred valid IP address range, one or several serial communication parameters, description of a preferred access protocol, preferred port range for the access protocol, and preferences of an authentication method such as password and username for access by the service terminal.

By means of the processing circuitry and the memory comprising instructions executable by the processing circuitry is the network device further configured to send to the service terminal, before establishing a communication, a message reporting the at least one new access setting for establishing a communication.

According to one embodiment of the network device, the network device is further configured to send to the service terminal, before establishing a communication, a message reporting the at least one new access setting for establishing a communication and by means of the processing circuitry 210 to control at least one sound or noise generating device of the network device so as to control the generation of audio waves to transfer the message.

According to one embodiment of the network device, the control of the at least one sound or noise generating device of the network device is performed by using digital modulation to control the generation of audio waves to transfer the message.

According to yet other embodiments of the network device, the at least one sound or noise generating device is a cooling fan or a speaker or a beeper device.

According to one embodiment of the network device, the network device is further configured to send to the service terminal, before establishing a communication, a message reporting the at least one new access setting for establishing a communication and by means of the processing circuitry 210 to control at least one light emitting device of the network device so as to control the generation of light emitted within the infrared to ultraviolet light spectrum to transfer the message.

According to further one embodiment of the network device, the at least one light emitting device is basically meant for indicating operation of the network device.

According to further one embodiment of the network device, the at least one light emitting device is a Light Emitting Diode, LED.

According to some embodiments of the network device, the network device or node is by means of the processing circuitry and the computer program configured to generate the message reporting the at least one new access setting for establishing a communication, the message has a packet structure comprising at least a packet prefix, an IP address, an access protocol identifier, and an authentication method identifier.

According to further embodiments of the network device, the network device is located within a network node.

According to further embodiments of the network device, the communication with the service terminal is performed via an Operation and Maintenance interface.

Figure 14:
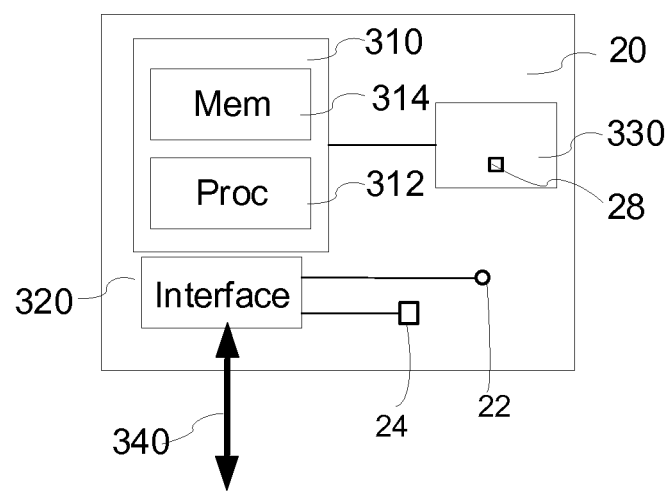
FIG. 14 is a block diagram illustrating one implementation of a service terminal.

FIG. 14 is a block diagram illustrating one implementation of a service terminal.

The service terminal 20 comprises at least one processing circuitry 310 comprising a processor unit 312 and a memory 314. The service terminal 20 further comprises one or several interfaces 320 for enabling input and output communication 340 with e.g. network devices, network nodes, units of the service terminal, etc. The service terminal 20 may also comprise computer readable means or computer readable storage medium 330 on which computer program is stored. Said means or medium 330 may be fixed in the network device or network node or removable. Generally, a processing circuitry 310 will receive instructions and data from a read-only memory and/or a random access memory, such as memory 314. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially designed ASICs (Application Specific Integrated Circuits).

The service terminal 20 is configured for enabling access security at Operation and Maintenance, O&M, support of a network device. The network device and the service terminal are configured to establish a communication using at least one access setting for establishing a communication. The at least one access setting comprises at least one of the following: an IP address, one or several serial communication parameters, access protocol, authentication method. The at least one access setting for establishing a communication with the service terminal is changed to at least one new access setting. The service terminal comprises a processing circuitry 310 and a memory 314 comprising instructions executable by the processing circuitry 310, wherein the instructions when executed by the processing circuitry 310 cause the service terminal 20 to receive from the network device a message reporting the at least one new access setting for establishing a communication with the network device, and to establish a communication with the network device by using the at least one new access setting.

According to one embodiment, the service terminal 20 is a wireless device comprising a microphone 24 for receiving from the network device a message reporting the at least one new access setting for establishing a communication with the network device. The processing circuitry 310 and the memory 314 comprising the instructions executable by the processing circuitry 310 is further configured to receive the message transferred by audio waves using the microphone of the service terminal, and to obtain the information of the message by means of a software application 28.

According to yet one embodiment, the service terminal 20 is a wireless device comprising a video camera 22 for receiving from the network device a message reporting the at least one new access setting for establishing a communication comprises. The processing circuitry 310 and the memory 314 comprising instructions executable by the processing circuitry is further configured to receive the message transferred by light within the infrared to ultraviolet light spectrum using the video camera of the service terminal, and to obtain the information of the message by means of a software application 28.

According to another embodiment, the service terminal is configured to receive the message used for reporting the at least one new access setting for establishing a communication, the message having a packet structure comprising at least a packet prefix, an IP address, an access protocol identifier, and an authentication method identifier.

A number of embodiments of the present technique have been described. It will be understood that various modifications may be made without departing from the scope of the dependent claims of the following claims.

The invention claimed is:

1. A network device comprising:
an Operations & Maintenance (O&M) interface having an access setting to be used for communicating with the network device via the O&M interface; and
processing circuitry configured to cause the network device to:
change the access setting to a new access setting, in response to the network device receiving a trigger for changing the access setting;
utilize an equipment item of the network device to output a signal that is independent of communicating on the O&M interface, for local detection by a sensor of a service terminal that is on-premise with the network device, the signal being an audio or visual signal and modulated to carry a message indicating the new access setting; and
establish communications with the service terminal via the O&M interface, in dependence on use by the service terminal of the new access setting;
wherein the access setting is any one or more of an IP address, a serial communication parameter, an access protocol, or an authentication method.

2. The network device according to claim 1, wherein the trigger is at least one of the following:
reception of an Update Service Access request from an Operation Service Support system (OSS);
an operation fault or security alarm generated in the network device;
a degradation of the performance of the network device;
attachment of the service terminal; or
a start signal activated by a Field Service Engineer (FSE).

3. The network device according to claim 2, wherein the trigger comprises receiving the Update Service Access request, and wherein the Update Service Access request conveys information relating to the new access setting, the information indicating one or more of: location information of the network device, a preferred valid IP address, a preferred valid IP address range, one or more serial communication parameters, a description of a preferred access protocol, a preferred port range for the access protocol, or one or more preferences regarding authentication of the service terminal.

4. The network device according to claim 1, wherein the equipment item comprises a sound or noise generating device of the network device, for outputting the signal as said audio signal, for detection by a microphone of the service terminal.

5. The network device according to claim 4, wherein the processing circuitry is configured to use digital modulation to control the sound or noise generating device of the network device to output the audio signal.

6. The network device according to claim 4, wherein the sound or noise generating device is a cooling fan or a speaker or a beeper device that is temporarily operated as an audio transmitter for conveyance of the message.

7. The network device according to claim 1, wherein the equipment item comprises a light emitting device of the network device, for outputting the signal as said visual signal, for detection by a video camera of the service terminal.

8. The network device according to claim 7, wherein the light emitting device is an operational indicator of the network device that is temporarily operated as an optical transmitter for conveyance of the message.

9. The network device according to claim 8, wherein the light emitting device is a Light Emitting Diode (LED).

10. The network device according to claim 1, wherein the service terminal is a wireless device and the sensor of the wireless terminal comprises a camera or a microphone for receiving the signal as said audio or visual signal, and wherein the processing circuitry is configured to utilize the equipment item of the network device to generate the signal as said audio or visual signal, to transfer the message to the service terminal.

11. The network device according to claim 1, wherein the message has a packet structure comprising at least a packet prefix, an IP address, an access protocol identifier, and an authentication method identifier, wherein the authentication method identifier indicates a corresponding authentication method as the new access setting.

12. The network device according to claim 1, wherein the network device is located within a network node.

13. A method performed by a service terminal that is on-premise with a network device, the method comprising:
using a sensor of the service terminal to detect a signal that is locally generated by the network device independent of communicating on an Operations & Maintenance (O&M) interface of the network device, the signal being an audio or visual signal and modulated to convey a message reporting a new access setting to be used for establishing communication with the network device via the O&M interface of the network device; and
establishing communication with the network device via the O&M interface, according to the new access setting;
wherein the new access setting is any one or more of an IP address, a serial communication parameter, an access protocol, or an authentication method.

14. A service terminal comprising:
a communications interface configured for on-premise communication with a network device via an Operations & Maintenance (O&M) interface of the network device; and
processing circuitry configured to:
utilize a sensor of the service terminal to detect a signal that is locally generated by the network device independent of communicating on the O&M interface of the network device, the signal being an audio signal or a visual signal and modulated to convey a message indicating a new access setting to be used by the service terminal for communicating with the network device via the O&M interface of the network device; and use the new access setting to establish communications with the network device via the O&M interface of the network device;

wherein the new access setting is any one or more of an IP address, a serial communication parameter, an access protocol, or an authentication method.

15. The service terminal according to claim 14, wherein the signal is said audio signal and the sensor comprises a microphone included in the service terminal.

16. The service terminal according to claim 14, wherein the signal is said visual signal and the sensor comprises a video camera included in the service terminal.

17. The service terminal according to claim 14, wherein the message has a packet structure comprising at least a packet prefix, an IP address, an access protocol identifier, and an authentication method identifier that indicates a corresponding authentication method as the new access setting.

18. A method at a network device, the method comprising:
receiving a trigger for changing an access setting to be used for communicating with a service terminal that is on-premise with the network device via an Operations & Maintenance (O&M) interface of the network device; and changing the access setting to a new access setting, in response to the trigger;

utilizing an equipment item of the network device to output a signal that is independent of communicating on the O&M interface, for local detection by a sensor of the service terminal, the signal being an audio or visual signal and modulated to carry a message indicating the new access setting; and establishing communications with the service terminal via the O&M interface, in dependence on use by the service terminal of the new access setting;

wherein the access setting is any one or more of an IP address, a serial communication parameter, an access protocol, or an authentication method.

19. The method of claim 18, wherein utilizing the equipment item of the network device to output the signal comprises temporarily controlling a sound or noise generating device of the network device to output the signal as said audio signal, for detection by a microphone of the service terminal.

20. The method of claim 18, wherein utilizing the equipment item of the network device to output the signal comprises temporarily controlling a light of the network device to output the signal as said visual signal, for detection by a video camera of the service terminal.

* * * * *